Sept. 23, 1952    G. ALEXATH    2,611,208
FISH LURE
Filed Jan. 24, 1949
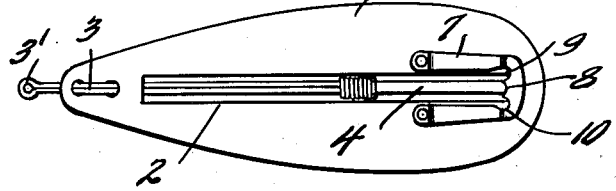
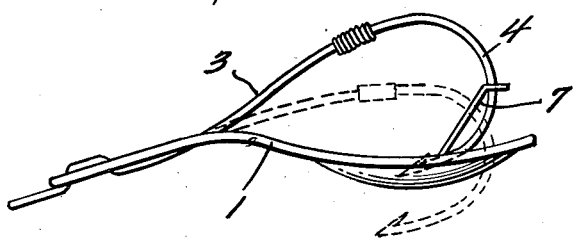
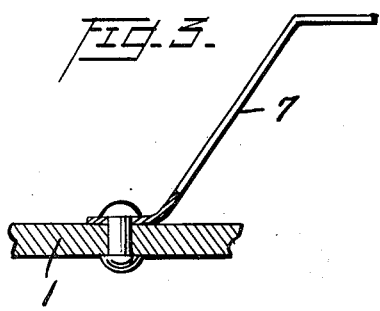
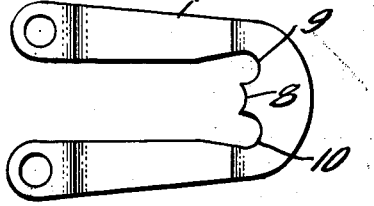
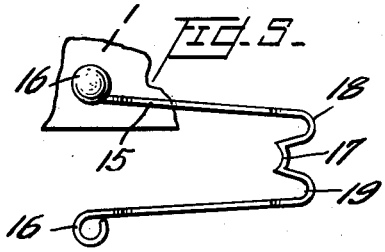
INVENTOR
Georges Alexath,
BY Sommers & Young
ATTORNEYS Patented Sept. 23, 1952

2,611,208

UNITED STATES PATENT OFFICE 2,611,208

FISH LURE

Georges Alexath, Lausanne, Switzerland

Application January 24, 1949, Serial No. 72,399
In Switzerland August 13, 1947

1 Claim. (Cl. 43—42.41)

This invention relates to fish-lures and like angling devices and has as its object the provision of a fish-lure in which a hook is mounted in such a manner that the point of the hook can occupy a protected position, in order to prevent the hook from hooking on to an obstacle, such as grass-branches, pebbles, lumps of earth, and the like, which might be on its path in the water, while by the action of a bite by a fish the hook will be released from its protected position.

In accordance with the invention, at least one hook is fixed by means of a spring on a supporting piece on which is mounted a stop catch retaining member which co-operates with the hook in such manner as to be able to maintain it in retracted position in which its point is protected, and to disengage it from that position under the effect of a bite by a fish.

The accompanying drawings illustrate by way of example preferred forms of execution of the fish-lure according to the invention.

Figure 1 is a plan view of one construction of the device;

Figure 2 is a view in elevation of this form of construction, the hook being in retracted position;

Figures 3 and 4 show a detail, in partial section and in plan respectively, of the retaining member shown in Figures 1 and 2;

Figure 5 is a modification of this detail showing part of the spoon broken away.

In the form of construction of Figures 1 and 2, the spoon-shaped lure 1 has a longitudinal slit 2. At one of the ends of the spoon 1 and of the slit 2 is fixed the spring wire 3 which extends in the direction of the slit and carries the hook 4. A retaining member 7 is constituted by a U-shaped piece of sheet metal which is fixed by its two branches on both sides of the slit 2 at the other end of the spoon 1, so that the free end of said piece 7 forms a spring. Figures 3 and 4 show this piece on a larger scale. The transverse part of the retaining piece has a small central notch 8 in which the hook 4 is held in its retracted position. On both sides of the notch 8 are provided recesses 9 and 10.

When a fish bites and pressure is applied to the surface of the spoon and to the hook, the latter is abruptly released from the notch 8 and passes through the slit 2 into the position shown in broken lines in Figure 2. When the hook receives lateral pressure under the shock of a bite by a fish it passes out of the notch 8 into one of the recesses 9 or 10 and is likewise released.

In the modification illustrated in Figure 5, the retaining member 15 is made of steel wire intended to be fixed to the spoon by means of rivets or screws passing through eyelets 16. The wire 15 is bent so as to have a central notch 17 forming a stop catch to hold the hook in the retracted position and two lateral releases 18 and 19, into one of which the hook falls if it is subjected to lateral pressure in consequence of a bite by a fish.

The fishing lures constructed in accordance with the invention have the advantage of having a hook the point of which is protected in the waiting position. The invention is not limited to the examples of construction illustrated, and it is also possible to combine other hook devices of which the principle of construction and the system of release come within the scope of the following claim.

I claim:

A fish lure comprising a hook provided with a curved portion, a supporting member therefor, a spring wire having one end secured to the supporting member and the other end carrying said hook, and locking means adapted to hold said hook in retracted position in which said spring wire is tensioned, said locking means including a notched member provided with a locking notch to releasably retain the hook at the curved portion thereof in retracted position, and with a release notch disposed laterally of the locking notch relatively to the plane of the hook, whereby said hook may be released from engagement with said notched member by pressure acting either in the plane of the hook or transversely to said plane owing to the bite of a fish.

GEORGES ALEXATH.

REFERENCES CITED

The following references are of record in the file of this patent:

UNITED STATES PATENTS

| Number | Name | Date |
| --- | --- | --- |
| 378,678 | Harlow | Feb. 28, 1888 |
| 969,014 | Walters | Aug. 30, 1910 |
| 2,431,434 | Tallaksen | Nov. 25, 1947 |